United States Patent
Hidayat

(10) Patent No.: US 9,602,543 B2
(45) Date of Patent: Mar. 21, 2017

(54) CLIENT/SERVER POLYMORPHISM USING POLYMORPHIC HOOKS

(71) Applicant: SHAPE SECURITY, INC., Mountain View, CA (US)

(72) Inventor: Ariya Hidayat, Mountain View, CA (US)

(73) Assignee: Shape Security, Inc., Mountain View, CA (US)

( * ) Notice: Subject to any disclaimer, the term of this patent is extended or adjusted under 35 U.S.C. 154(b) by 74 days.

(21) Appl. No.: 14/481,867

(22) Filed: Sep. 9, 2014

(65) Prior Publication Data

US 2016/0149953 A1    May 26, 2016

(51) Int. Cl.
  G06F 17/00    (2006.01)
  H04L 29/06    (2006.01)
  G06F 21/52    (2013.01)

(52) U.S. Cl.
  CPC .............. *H04L 63/20* (2013.01); *G06F 21/52* (2013.01)

(58) Field of Classification Search
  CPC ................................. H04L 63/20; G06F 21/52
  USPC .................... 726/1, 15, 22; 709/203, 22, 229
  See application file for complete search history.

(56) References Cited

U.S. PATENT DOCUMENTS

| | | | |
|---|---|---|---|
| 5,870,769 A | 2/1999 | Freund | |
| 5,987,611 A | 11/1999 | Freund | |
| 6,170,020 B1 | 1/2001 | Blakeney | |
| 6,275,789 B1 | 8/2001 | Moser | |
| 6,401,077 B1 | 6/2002 | Godden | |
| 6,668,325 B1 | 12/2003 | Collberg | |
| 6,938,170 B1 | 8/2005 | Kraft | |

(Continued)

FOREIGN PATENT DOCUMENTS

| | | |
|---|---|---|
| GB | 2 443 093 A | 4/2008 |
| WO | WO00/72119 A2 | 11/2000 |

(Continued)

OTHER PUBLICATIONS

U.S. Appl. No. 14/286,733, filed May 23, 2014, Office Action, May 27, 2015.

(Continued)

*Primary Examiner* — Thu Ha Nguyen
(74) *Attorney, Agent, or Firm* — Hickman Palermo Becker Bingham LLP

(57) ABSTRACT

Computer systems and methods in various embodiments are configured for improving the security and efficiency of client computers interacting with server computers through an intermediary computer using one or more polymorphic protocols. In an embodiment, a computer system comprises a memory; a processor coupled to the memory; a processor logic coupled to the processor and the memory, and configured to: intercept, from a server computer, a first file and a second file, wherein the first file defines a first object with a first identifier and the second file comprises a reference to the first object by the first identifier; generate a second identifier; replace the first identifier with the second identifier in the first file; add one or more first instructions to the first file; remove the reference to the first identifier from the second file; add, to the second file, one or more second instructions, which when executed cause the one or more first instructions to be executed and produce the second identifier.

24 Claims, 7 Drawing Sheets

(56) References Cited

U.S. PATENT DOCUMENTS

| | | | |
|---|---|---|---|
| 6,957,229 B1 | 10/2005 | Dyor | |
| 7,180,895 B2 | 2/2007 | Smith | |
| 7,424,706 B2 | 9/2008 | Ivanov | |
| 7,480,385 B2 | 1/2009 | Weber | |
| 7,587,616 B2 | 9/2009 | Jakubowski | |
| 7,620,987 B2 | 11/2009 | Shelest | |
| 7,660,902 B2* | 2/2010 | Graham | G06F 21/6245 709/203 |
| 7,705,829 B1 | 4/2010 | Plotnikov | |
| 7,707,223 B2 | 4/2010 | Zubenko et al. | |
| 7,793,220 B1 | 9/2010 | Liang | |
| 7,801,942 B2* | 9/2010 | Caruso | G06F 17/30864 709/200 |
| 7,836,425 B2 | 11/2010 | Rubin et al. | |
| 7,840,996 B1* | 11/2010 | Wu | H04L 63/0272 707/828 |
| 7,895,653 B2 | 2/2011 | Calo et al. | |
| 7,940,657 B2 | 5/2011 | Perreault | |
| 7,961,879 B1 | 6/2011 | Spies | |
| 8,020,193 B2 | 9/2011 | Bhola et al. | |
| 8,077,861 B2 | 12/2011 | Damgaard | |
| 8,170,020 B2 | 5/2012 | Oliver et al. | |
| 8,200,958 B2 | 6/2012 | Coppola et al. | |
| 8,220,054 B1 | 7/2012 | Lu | |
| 8,266,202 B1 | 9/2012 | Colton et al. | |
| 8,392,910 B1 | 3/2013 | Asher | |
| 8,397,073 B1* | 3/2013 | Richardson | H04L 67/1097 713/150 |
| 8,516,080 B2 | 8/2013 | Chow | |
| 8,548,998 B2 | 10/2013 | Plotnik | |
| 8,601,064 B1 | 12/2013 | Liao | |
| 8,661,549 B2 | 2/2014 | Chevallier-Mames | |
| 8,676,273 B1 | 3/2014 | Fujisaki | |
| 8,695,091 B2* | 4/2014 | Komili | H04L 63/102 705/14.4 |
| 8,762,705 B2 | 6/2014 | He | |
| 8,806,618 B2 | 8/2014 | Livshits | |
| 8,904,279 B1 | 12/2014 | Bougon | |
| 8,949,978 B1* | 2/2015 | Lin | G06F 21/51 726/12 |
| 8,954,583 B1* | 2/2015 | Zhou | H04L 67/42 709/224 |
| 9,241,004 B1 | 1/2016 | April | |
| 9,294,502 B1 | 3/2016 | Benishti | |
| 2002/0016918 A1 | 2/2002 | Tucker | |
| 2002/0188631 A1 | 12/2002 | Tiemann | |
| 2004/0162994 A1 | 8/2004 | Cohen | |
| 2004/0230889 A1 | 11/2004 | Ishiyama | |
| 2004/0245525 A1 | 12/2004 | Yamazaki | |
| 2004/0249938 A1 | 12/2004 | Bunch | |
| 2005/0010764 A1* | 1/2005 | Collet | G06F 21/10 713/165 |
| 2005/0160161 A1* | 7/2005 | Barrett | H04L 63/20 709/223 |
| 2005/0278627 A1 | 12/2005 | Malik | |
| 2006/0053295 A1 | 3/2006 | Madhusudan et al. | |
| 2006/0075140 A1* | 4/2006 | Sobel | H04L 63/105 709/245 |
| 2006/0075260 A1 | 4/2006 | Tucker | |
| 2006/0156278 A1 | 7/2006 | Reager | |
| 2007/0039048 A1 | 2/2007 | Shelest | |
| 2007/0064617 A1 | 3/2007 | Reves | |
| 2007/0074227 A1* | 3/2007 | Naidu | G06F 9/54 719/330 |
| 2007/0079285 A1 | 4/2007 | Cook | |
| 2007/0150299 A1* | 6/2007 | Flory | G06Q 10/10 705/51 |
| 2008/0222736 A1 | 9/2008 | Bodaei et al. | |
| 2008/0244078 A1 | 10/2008 | Viljuen et al. | |
| 2008/0250310 A1 | 10/2008 | Chen | |
| 2008/0285464 A1* | 11/2008 | Katzir | H04L 63/1408 370/241 |
| 2008/0320567 A1 | 12/2008 | Shulman | |
| 2009/0077383 A1 | 3/2009 | De Monseignat | |
| 2009/0119515 A1 | 5/2009 | Nicolson | |
| 2009/0144829 A1 | 6/2009 | Grigsby et al. | |
| 2009/0193129 A1* | 7/2009 | Agarwal | H04L 63/0281 709/229 |
| 2009/0193513 A1 | 7/2009 | Agarwal et al. | |
| 2009/0216882 A1 | 8/2009 | Britton | |
| 2009/0235089 A1 | 9/2009 | Ciet | |
| 2009/0249310 A1 | 10/2009 | Meijer et al. | |
| 2009/0249492 A1 | 10/2009 | Boesgaard Sorensen | |
| 2009/0254572 A1 | 10/2009 | Redlich | |
| 2009/0282062 A1 | 11/2009 | Husic | |
| 2010/0037150 A1 | 2/2010 | Sawant | |
| 2010/0083072 A1 | 4/2010 | Prasad | |
| 2010/0107245 A1 | 4/2010 | Jakubowski | |
| 2010/0131512 A1 | 5/2010 | Ben-Natan | |
| 2010/0172494 A1 | 7/2010 | Henson | |
| 2010/0180346 A1 | 7/2010 | Nicolson | |
| 2010/0235636 A1 | 9/2010 | Cohen | |
| 2010/0257354 A1 | 10/2010 | Johnston et al. | |
| 2010/0262780 A1 | 10/2010 | Mahan et al. | |
| 2010/0269152 A1 | 10/2010 | Pahlavan | |
| 2010/0281459 A1 | 11/2010 | Betouin | |
| 2010/0287132 A1 | 11/2010 | Hauser | |
| 2011/0015917 A1 | 1/2011 | Wang et al. | |
| 2011/0022846 A1* | 1/2011 | Ginter | G06F 21/10 713/176 |
| 2011/0107077 A1 | 5/2011 | Henderson et al. | |
| 2011/0129089 A1 | 6/2011 | Kim | |
| 2011/0138012 A1 | 6/2011 | Tiemann | |
| 2011/0154473 A1 | 6/2011 | Anderson et al. | |
| 2011/0252415 A1 | 10/2011 | Ricci | |
| 2011/0255689 A1 | 10/2011 | Bolotov et al. | |
| 2011/0296391 A1 | 12/2011 | Gass et al. | |
| 2012/0022942 A1 | 1/2012 | Holloway et al. | |
| 2012/0096116 A1 | 4/2012 | Mislove et al. | |
| 2012/0124372 A1 | 5/2012 | Dilley et al. | |
| 2012/0173699 A1 | 7/2012 | Niemela | |
| 2012/0174225 A1 | 7/2012 | Shyamsunder | |
| 2012/0180021 A1 | 7/2012 | Byrd et al. | |
| 2012/0198528 A1 | 8/2012 | Baumhof | |
| 2012/0240184 A1* | 9/2012 | Thirasuttakorn | H04W 12/08 726/1 |
| 2012/0254727 A1 | 10/2012 | Jain | |
| 2012/0254845 A1 | 10/2012 | Yi | |
| 2013/0041986 A1 | 2/2013 | Colton et al. | |
| 2013/0067225 A1 | 3/2013 | Schochet | |
| 2013/0091582 A1 | 4/2013 | Chen et al. | |
| 2013/0152071 A1 | 6/2013 | Asher | |
| 2013/0198607 A1 | 8/2013 | Mischook et al. | |
| 2013/0232234 A1 | 9/2013 | Kapur et al. | |
| 2013/0232343 A1 | 9/2013 | Horning | |
| 2013/0232578 A1 | 9/2013 | Chevallier-Mame | |
| 2013/0239172 A1* | 9/2013 | Murakami | G06F 21/42 726/1 |
| 2014/0040787 A1* | 2/2014 | Mills | G06F 3/048 715/760 |
| 2014/0089786 A1 | 3/2014 | Hashmi | |
| 2014/0165197 A1 | 6/2014 | Ur | |
| 2014/0189499 A1 | 7/2014 | Gigliotti | |
| 2014/0223290 A1 | 8/2014 | Hathaway | |
| 2014/0281535 A1 | 9/2014 | Kane | |
| 2014/0282872 A1 | 9/2014 | Hansen | |
| 2014/0283069 A1 | 9/2014 | Call | |
| 2014/0359571 A1 | 12/2014 | Sasikumar et al. | |
| 2015/0039962 A1 | 2/2015 | Fonseka | |
| 2015/0180509 A9 | 6/2015 | Fonseka | |
| 2015/0195305 A1 | 7/2015 | He | |
| 2016/0026611 A1 | 1/2016 | Liu | |
| 2016/0028760 A1 | 1/2016 | Yang et al. | |
| 2016/0036848 A1* | 2/2016 | Reddy | H04L 63/0227 726/22 |
| 2016/0057111 A1 | 2/2016 | Call et al. | |
| 2016/0080515 A1* | 3/2016 | Kruglick | G06F 9/44505 709/203 |
| 2016/0191351 A1 | 6/2016 | Smith | |

(56) References Cited

U.S. PATENT DOCUMENTS

| | | | |
|---|---|---|---|
| 2016/0205140 A1* | 7/2016 | Verma | G06F 17/30463 726/1 |
| 2016/0212101 A1* | 7/2016 | Reshadi | H04L 63/0414 |
| 2016/0232158 A1* | 8/2016 | Glover | G06F 17/2288 |

FOREIGN PATENT DOCUMENTS

| | | |
|---|---|---|
| WO | WO02/093369 A1 | 11/2002 |
| WO | WO2013091709 | 6/2013 |

OTHER PUBLICATIONS

U.S. Appl. No. 14/055,704, filed Oct. 16, 2013, Interview Summary, Apr. 9, 2015.

U.S. Appl. No. 14/055,704, filed Oct. 16, 2013, Final Office Action, Apr. 9, 2015.

International Searching Authority, "Search Report" in application No. PCT/US15/12072, dated Jan. 20, 2015, 14 pages.

Currie et al., In-the-Wire Authentication: Protecting Client-Side Critical Data Fileds in Secure Network Transactions, dated 2009 2nd International Con. Adapt. Science & Tech. IEEE, pp. 232-237.

Sedaghat et al., "On-The-Fly Web Content Integrity Check Boosts User's Confidence", Communications for the ACM, vol. 45, Issue 11, dated Nov. 2002, 5 pages.

Matsunaka et al., "Detecting and Preventing Drive-By Download Attack via Participative Monitoriing of the Web", Information Security, dated Jul. 26, 2013, 8th Asia Joint Conference, pp. 48-55.

European Patent Office, "Search Report" in application No. PCT/US2015/031361, dated Jul. 28, 2015, 13 pages.

U.S. Appl. No. 14/618,389, filed Feb. 10, 2015, Office Action, Oct. 5, 2015.

U.S. Appl. No. 61/788,250, filed Mar. 15, 2013, Oct. 28, 2015.

U.S. Appl. No. 14/679,596, filed Apr. 6, 2015, Office Action, Nov. 4, 2015.

U.S. Appl. No. 14/481,835, filed Sep. 9, 2014, Office Action, Oct. 28, 2015.

International Searching Authority, "Search Report" in application No. PCT/US2015/049024, dated Jan. 19, 2016, 10 pages.

Claims in application No. PCT/US2015/049024, dated Jan. 2016, 8 pages.

U.S. Appl. No. 14/329,718, filed Jul. 11, 2014, Office Action, Feb. 3, 2016.

U.S. Appl. No. 14/099,437, filed Dec. 6, 2013, Notice of Allowability, Jan. 25, 2016.

European Patent Office, "Search Report" in application No. PCT/US2014/023635, dated Jan. 21, 2015, 11 pages.

Li et al., "WebShield: Enabling Various Web Defense Techniques Without Client Side Modifications", dated Aug. 15, 2009, 18 pages.

European Patent Office in application No. PCT/US2014/068133, dated Apr. 7, 2015, 14 pages.

Claims in European Application No. PCT/US2014/068133, dated Apr. 2015, 16 pages.

W3Schools.com. "Javascript Timing Events", dated Dec. 31, 2013, accessed online, http://web.archive.org/web/20131231074905/http://w3schools.com/js/js_timing.asp, 30 pages.

The International Bureau of WIPO, "International Preliminary Report on Patentability" in application No. PCT/US2014/068133, dated Jun. 21, 2016, 12 pages.

Claims in application No. PCT/US2014/068133 dated Jun. 2016, 16 pages.

U.S. Appl. No. 14/702,140, filed May 1, 2015, Final Office Action, May 19, 2016.

U.S. Appl. No. 14/481,835, filed Sep. 9, 2014, Notice of Allowance, Apr. 27, 2016.

U.S. Appl. No. 14/329,718, filed Jul. 11, 2014, Final Office Action, May 6, 2016.

U.S. Appl. No. 14/968,460, filed Dec. 14, 2015, Office Action, Apr. 8, 2016.

U.S. Appl. No. 14/702,349, filed May 1, 2015, Office Action, Feb. 1, 2016.

U.S. Appl. No. 14/679,596, filed Apr. 6, 2015, Final Office Action, Mar. 30, 2016.

U.S. Appl. No. 14/618,389, filed Feb. 10, 2015, Notice of Allowance, Mar. 16, 2016.

U.S. Appl. No. 14/618,389, filed Feb. 10, 2015, Supplemental Notice of Allowability, Apr. 12, 2016.

U.S. Appl. No. 14/602,038, filed Jan. 21, 2015, Office Action, Apr. 22, 2016.

U.S. Appl. No. 14/570,466, filed Dec. 15, 2014, Office Action, Apr. 21, 2016.

U.S. Appl. No. 14/286,324, filed May 23, 2014, Final Office Action, Apr. 20, 2016.

Davido et al., "Understanding Split and Join", PerlMonks, http://www.perlmonks.org/?node_id=591988, dated Dec. 28, 2006, 10 pages.

U.S. Appl. No. 14/930,198, filed Nov. 2, 2015, Office Action, Jul. 21, 2016.

U.S. Appl. No. 14/702,349, filed May 1, 2015, Final Office Action, Jul. 15, 2016.

U.S. Appl. No. 14/329,718, filed Jul. 11, 2014, Final Office Action, Feb. 20, 2015.

U.S. Appl. No. 14/055,714, filed Oct. 16, 2013, Office Action, Mar. 16, 2015.

U.S. Appl. No. 14/055,576, filed Oct. 16, 2013, Office Action, Feb. 26, 2015.

U.S. Appl. No. 14/702,140, filed May 1, 2015, Office Action, Oct. 23, 2015.

Yang, U.S. Appl. No. 15/052,951, filed Feb. 25, 2016, Office Action, mailed Oct. 7, 2016.

Hoover, U.S. Appl. No. 14/713,493, filed May 15, 2015, Office Action, mailed Oct. 7, 2016

* cited by examiner

CLIENT/SERVER POLYMORPHISM USING POLYMORPHIC HOOKS

FIELD OF THE DISCLOSURE

The present disclosure generally relates to security techniques applicable to client/server systems, and relates more specifically to techniques for improving the security of client computers interacting with server computers through an intermediary computer using one or more polymorphic protocols.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Browsers are powerful computer program applications that may request and execute instructions received from a web server to generate complex user interfaces that are presented to a user through one or more devices, such as a monitor or speakers. In response to input from a user, such as a mouse click indicating that the user selected an object defined in the instructions, such as a link, a browser may send a request based on the selected object to the web server. The request may be a request for data and/or include data to be processed by the web server.

Attackers may use software, often referred to as a "bot", which imitates a browser by receiving instructions from a web server and generating requests based on those instructions. For example, a bot may receive a web page, gather data in one or more objects defined in the web page, and generate a request for another web page to gather additional data, as if a user using a browser was requesting a new web page. Also for example, a bot may generate and send a request with data assigned to one or more parameters to simulate a user submitting data to a web server through a browser.

Attackers may use bots to commit many types of unauthorized acts, crimes or computer fraud, such as content scraping, ratings manipulation, fake account creation, reserving rival goods attacks, ballot stuffing attacks, password snooping, web site scraping attacks, vulnerability assessments, and stack fingerprinting attacks. As a specific example, a malicious user may cause a bot to traverse through pages of a web site and collect private and/or proprietary data, such as who is connected with whom on a particular social networking web site.

Web server administrators may wish to prevent malicious users from attacking the site, while allowing legitimate users to use the site as intended. However, determining which requests are generated by a legitimate user using a web browser and a malicious user using a bot may be difficult.

SUMMARY

The appended claims may serve as a summary of the invention.

Figure 3:
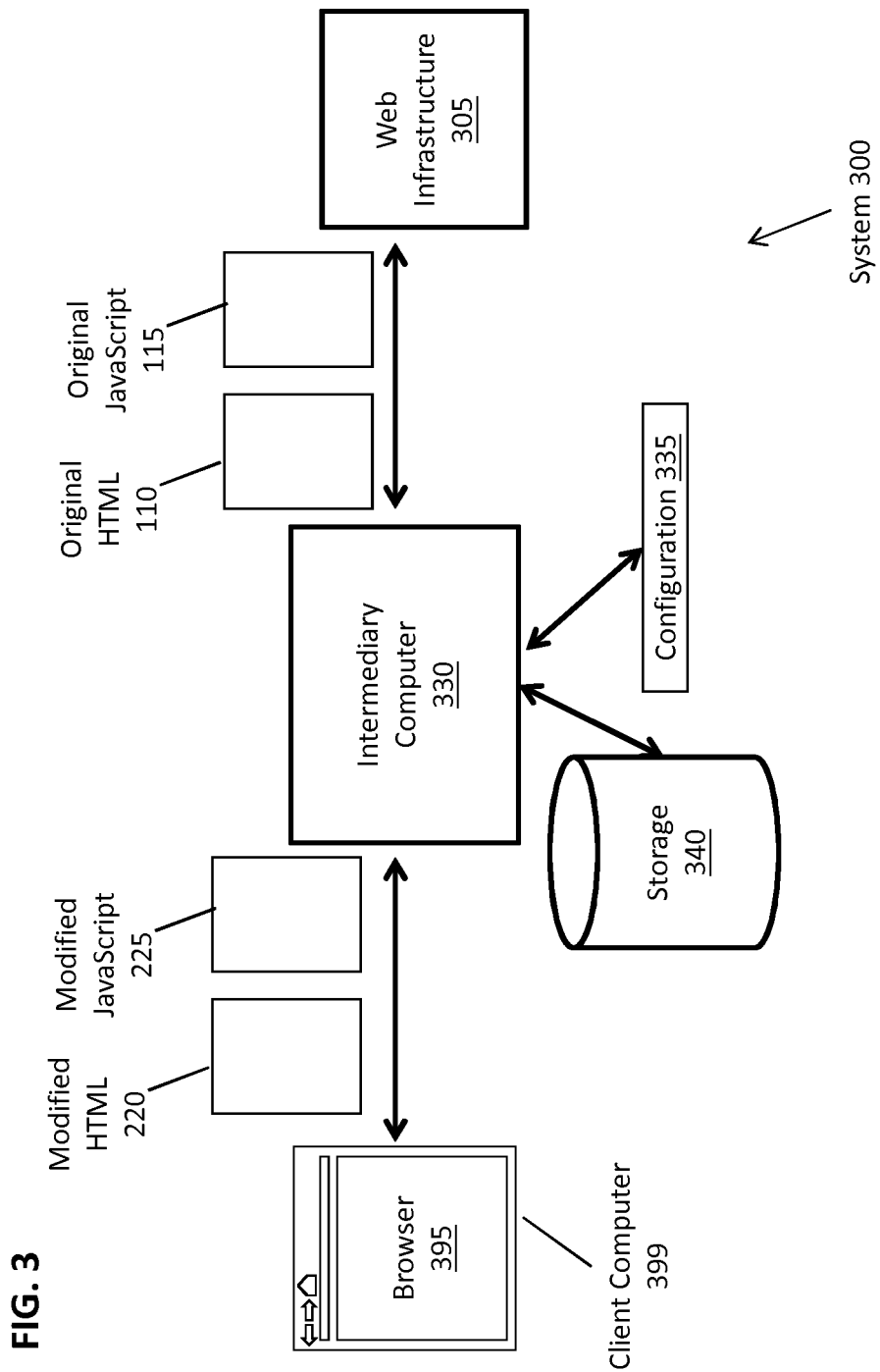
FIG. 3 illustrates a computer system comprising a browser, a web infrastructure, and an intermediary computer, which may be configured to perform one or more polymorphic protocols, in an example embodiment.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments. For example, intermediary computer 330 in FIG. 3 may be described with reference to several components illustrated in FIG. 5 and discussed in detail below, but using the particular arrangement illustrated in FIG. 3 is not required in other embodiments. Furthermore, while the instructions discussed in many example embodiments are HyperText Markup Language ("HTML") and JavaScript instructions, in other embodiments, the instructions intercepted and generated may be any other standard and/or proprietary instructions configured to be executed by a client computer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Browsers, Bots, and Attacks
    3.0 Polymorphism
        3.1 Inline Polymorphism
        3.2 Polymorphism with Polymorphic Hooks
    4.0 Example Network Topology that Implements one or more Polymorphic Protocols 4.1 Web Infrastructure
4.2 Intermediary Computer
    4.2.1 Protocol Client Logic
    4.2.2 Processing Logic
    4.2.3 Forward Polymorphic Logic
    4.2.4 Protocol Server Logic
    4.2.5 Transaction Logic
    4.2.6 Reverse Polymorphic Logic
    4.2.7 Configurations
    4.2.8 Storage
4.3 Browser
5.0 Process Overview
    5.1 Intercepting Instructions from a Server Computer
    5.2 Generating Modified Files with one or more New Polymorphic Hooks
    5.3 Adding Polymorphic Hooks
        5.3.1 Polymorphic Hook Countermeasures
            5.3.1.1 Implementing a Multistate Polymorphic Hook
            5.3.1.2 Implementing a Polymorphic Hook that Validates a Call Tree via a Stack Trace
    5.4 Modifying Instructions in Other Files to use the Polymorphic Hooks
    5.5 Updating one or more References to one or more Files that include one or more Instructions that Reference a Modified Object
    5.6 Storing the Modified Files to the Client Computer
    5.7 Sending the Modified Files to the Client Computer
    5.8 Receiving a New Request
    5.9 Reusing Previously Generated Files
6.0 Implementation Mechanisms—Hardware Overview
7.0 Other Aspects of Disclosure
1.0 General Overview In an embodiment, a computer system configured to improve security of client computers interacting with server computers through an intermediary computer using one or more polymorphic protocols, and comprises a memory; a processor coupled to the memory; a processor logic coupled to the processor and the memory, and configured to: intercept, from a server computer, a first file and a second file, wherein the first file defines a first object with a first identifier and the second file comprises a reference to the first object by the first identifier; generate a second identifier; replace the first identifier with the second identifier in the first file; add one or more first instructions to the first file; remove the reference to the first identifier from the second file; add, to the second file, one or more second instructions, which when executed cause the one or more first instructions to be executed and produce the second identifier.

In an embodiment, wherein as part of removing the reference and adding the one or more second instructions, the processor logic is further configured to replace the reference with the one or more second instructions, which when executed return the second identifier; send the first file and the second file to a first client computer.

In an embodiment, wherein as part of removing the reference and adding the one or more second instructions, the processor logic is further configured to replace the reference with at least one instruction from the one or more second instructions, which when executed in concert with one or more other instructions in the one or more second instructions returns the second identifier.

In an embodiment, the processor logic is further configured to: intercept, from the server computer, a new copy of the first file, wherein the new copy of the first file defines the first object with the first identifier; generate a third identifier, wherein the third identifier is different than the first identifier; replace the first identifier with the third identifier in the new copy of the first file; add, to the new copy of the first file, one or more third instructions, wherein the one or more third instructions are different than the one or more first instructions; send the new copy of the first file with the one or more third instructions, but without the one or more first instructions to the first client computer, wherein the new copy of the first file is configured to not cause the first client computer to re-download the second file, wherein the one or more second instructions, when executed by the first client computer causes the one or more third instructions to be executed and produce the third identifier.

In an embodiment, a computer system is configured to improve security of client computers interacting with server computers through an intermediary computer using one or more polymorphic protocols, and comprises: a memory; a processor coupled to the memory; a polymorphic logic coupled to the processor and the memory, and configured to: intercept, from a server computer, a first file comprising a set of tags in HTML and a second file comprising one or more initial JavaScript instructions, wherein the set of tags define a first object with a first identifier and the one or more initial JavaScript instructions include a reference to the first object by the first identifier; generate a second identifier; replace the first identifier with the second identifier in the set of tags; add one or more first JavaScript instructions to the first file; remove the reference to the first identifier from the one or more initial JavaScript instructions; add, to the second file, one or more second JavaScript instructions, which when executed cause the one or more first JavaScript instructions to be executed and produce the second identifier.

In an embodiment, a data processing method for improving security of client computers interacting with server computers through an intermediary computer using one or more polymorphic protocols comprises: intercepting, from a server computer, a first file and a second file, wherein the first file defines a first object with a first identifier and the second file comprises a reference to the first object by the first identifier; generating a second identifier; replacing the first identifier with the second identifier in the first file; adding one or more first instructions to the first file; removing the reference to the first identifier from the second file; adding, to the second file, one or more second instructions, which when executed cause the one or more first instructions to be executed and produce the second identifier.

In an embodiment, a data processing method for improving security and performance of client computers interacting with server computers comprising: receiving, from a server computer, a first file, wherein the first file defines a first object with a first identifier and one or more first instructions, which when executed correctly return the first identifier; receiving, from the server computer, a second file with one or more second instructions, which when executed causes the one or more first instructions to be executed correctly and produce the first identifier; wherein the first file is received separately from the second file.

In an embodiment, wherein the second file does not include the first identifier, the data processing method further comprising: executing the one or more second instructions, and in response, receiving the first identifier; and executing one or more additional instructions defined in the second file using the first identifier.

In an embodiment, the data processing method further comprising: caching the second file; receiving, from the server computer, a new first file, wherein the new first file defines the first object and identifies the first object by a second identifier, but not by the first identifier, and one or more new first instructions, which when executed correctly return the second identifier; executing the one or more second instructions that are cached, which cause the one or more new first instructions to return the second identifier, and in response, receiving the second identifier; using the second identifier in the one or more additional instructions defined in the second file.

In an embodiment, the data processing method further comprising: receiving, from the server computer, a new first file, wherein the new first file defines the first object with a second identifier, and the first object is not identified by the first identifier, and one or more new first instructions, which when executed correctly return the second identifier; wherein the one or more second instructions previously downloaded are not configured to cause the one or more new first instructions to be executed correctly; wherein the first file references a different version of the second file; determining that the new first file identifies the different version of the second file, and in response, requesting the different version of the second file; wherein the different version of the second file includes one or more new second instructions, which executed cause the one or more new first instructions to be executed correctly and return the second identifier.

Embodiments discussed herein provide numerous benefits and improvements over the general idea of increasing the resistance of browsers to computer attacks. For example, one or more of the embodiments discussed herein may reduce the amount of bandwidth required and/or used between a client computer and a server computer. One or more of the embodiments discussed herein may allow a client computer and/or a server computer to cache and/or reuse one or more files even though one or more objects may be modified over time according to one or more polymorphic protocols. One or more of the embodiments discussed herein may allow a server computer to use less computational resources because one or more cached files need not be regenerated each time one or more objects in one or more files are modified.

2.0 Browsers, Bots, and Attacks

A web browser may be a tool through which server-based application programs can provide client computers with content in a dynamic, custom UI. For example, in response to receiving a request for data from a web browser, a web server may respond with a set of instructions that define one or more objects with one or more object identifiers. The instructions may use the object identifiers to define how objects may be presented in a UI to enable human/computer interaction. For convenience of expression, a set of instructions may be referred to herein as a file and/or web page. A set of instructions, file, and/or web page need not have a particular type or extension, and need not be stored in persistent storage. For example, a web page may be generated dynamically based on one or more parameters. While some files may be identified as a particular type of file, such as an "HTML file" or "JavaScript file", a file may include mixed content. For example, an HTML file may include HTML, JavaScript, Cascading Style Sheets ("CSS"), and/or any other standard and/or proprietary set of instructions. Furthermore, a file need not be a file stored in persistent storage.

In contrast, bots traverse web pages and/or web sites to retrieve data from, and/or submit data to, one or more web servers with little, if any, human/computer interaction. For example, in response to receiving a request for data from a bot, a web server may respond with a set of instructions. A bot may parse the instructions to collect data from, and/or to store data in, particular objects with particular object identifiers. A bot may also make requests based on an object identifier, such as the identifier for a text field input. However, unlike a browser, a bot need not execute the instructions that define how objects should be presented in a UI because the bot is built to operate with little, if any, human/computer interaction. Thus, a bot may be a functionally-limited browser. For example, a browser may include a JavaScript runtime environment, which executes JavaScript instructions that define how one or more objects are presented to a user. However, a bot need not include a JavaScript runtime environment because a bot need not present objects to a user.

An attacker may use object identifiers in various attacks, such as a man-in-the-browser attack. In a man-in-the-browser attack, malicious code may be injected in a web browser, which when executed may gather data that is entered by a user into particular fields with particular identifiers before the data is encrypted and sent to the intended recipient. For example, a user may enter account information into a web browser that is displaying a web page from the user's bank. The web page may be a login page to access the user's account information and funds. The malicious code may scan particular fields with particular identifiers in the web page to collect the user's account information before the user's account information is encrypted and sent to the user's bank. The malicious code may send the collected data from those fields to the attacker's computer.

3.0 Polymorphism

One or more polymorphic protocols may be used to prevent and/or deter attacks. A polymorphic protocol may be a policy that defines which object(s), in which web page(s) and/or instruction(s), are modified and/or how each object is modified. For example, a polymorphic protocol may indicate that one or more objects should be modified to include one or more new object identifiers each time one or more particular web pages are requested. A polymorphic protocol may define which object(s) should be modified based on one or more factors, such as object type(s), object identifier(s), parent object(s), and/or child object(s). Other factors may include, but are not limited to, the Uniform Resource Locator ("URL") of the web page, one or more parameters in a URL, the domain name included in the URL, the user and/or the client computer requesting the web page, the protocol used to send and/or receive the web page, and/or any parameter associated with a web page, user, client computer, server computer, and/or network topology.

Modifying one or more object identifiers in the instructions sent from a server computer to a browser may prevent, and/or reduce the effectiveness of bots and/or one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities. For example, if each time a web page is requested, such as an account creation page, order page, voting page, and/or other page from a web server computer, the objects, and/or the object identifiers, in the original set of instructions are modified, then malicious code that relies on particular object identifiers may be rendered useless.

Figure 1:
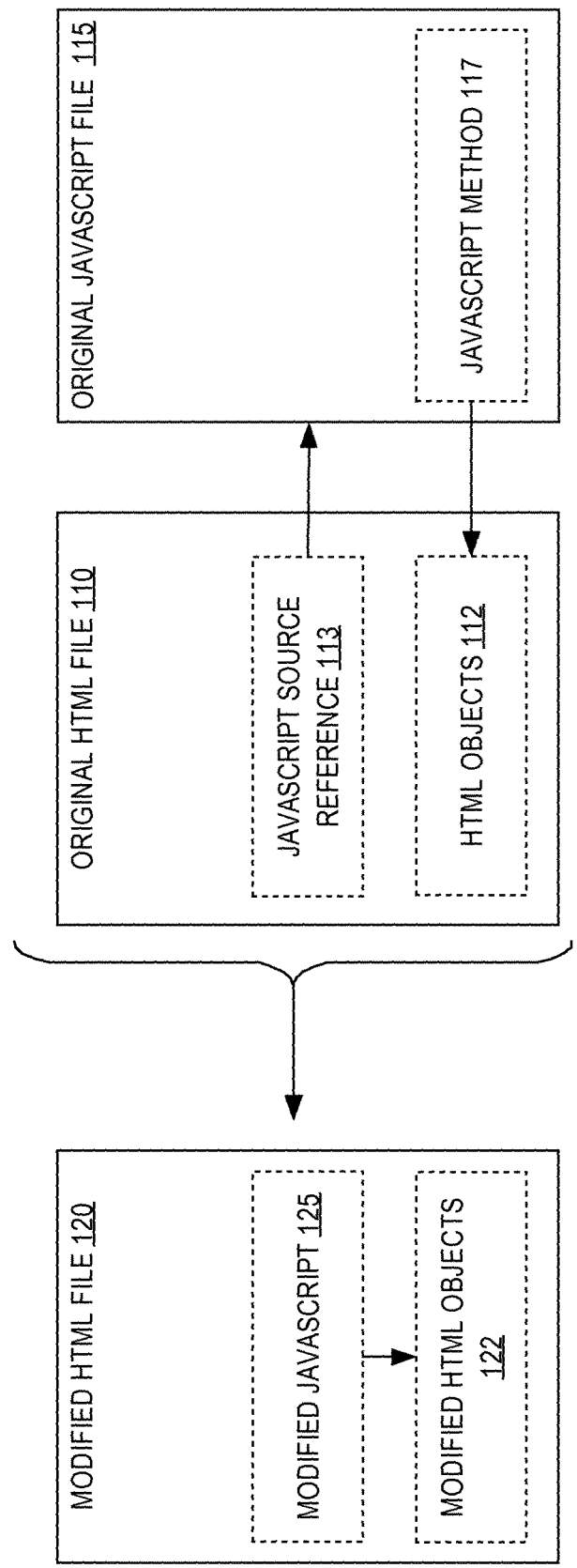
FIG. 1 illustrates a modified HTML file generated from an original HTML document and an original JavaScript document according to one or more polymorphic protocols in an example embodiment.

FIG. 1 illustrates a modified HTML file generated from an original HTML document and an original JavaScript document according to one or more polymorphic protocols in an example embodiment. In FIG. 1, original HTML file 110 and original JavaScript file 115 are files comprising instructions that may be stored on, and/or generated by, a web server computer in response to a request from a browser begin executing on a client computer. A computer, such as the web server computer and/or an intermediary computer, with polymorphic logic that implements one or more polymorphic protocols, may intercept original HTML file 110 and original JavaScript file 115 and generate modified HTML file 120 based the one or more polymorphic protocols. The polymorphic logic may send modified HTML file 120, which comprises modified object identifiers, to the browser on a client computer that originally requested original HTML file 110. Logic may be hardware and/or software modules executed in concert with, and/or by, one or more computers, such as a web server computer, or a computer coupled to a web server computer.

In FIG. 1, original HTML file 110 comprises HTML objects 112 and JavaScript source reference 113. HTML objects 112 may include HTML that defines one or more objects. JavaScript source reference 113 may reference one or more files comprising additional instructions, such as original JavaScript file 115. Original JavaScript file 115 may include JavaScript method 117, which comprises one or more instructions that reference one or objects in HTML objects 112. For purposes of illustrating a clear example, assume that Snippet 1 is an excerpt from HTML objects 112, Snippet 2 is an excerpt from JavaScript source reference 113, and Snippet 3 is an excerpt from JavaScript method 117.

| Snippet 1 | |
|---|---|
| line 1: | \<form id="login"\> |
| line 2: | \<p\>E-mail: \<input id="email" name="email"/\>\</p\> |
| line 3: | \<button type="submit"\>Login\</button\> |
| line 4: | \</form\> |

| Snippet 2 | |
|---|---|
| line 1: | \<script src="login.js"\>\</script\> |

| Snippet 3: | |
|---|---|
| line 1: | document.getElementById("email").value = "Enter email"; |

Snippet 1 defines an input object with a unique identifier: "email". Snippet 2 references a JavaScript file named "login.js". For purposes of illustrating a clear example, assume "login.js" is the name for original JavaScript file 115. Snippet 3 includes a JavaScript instruction that references the input object by the input object's identifier and assigns the text, or "value", of the input object to "Enter email".

To prevent attackers from finding and/or using the input object defined in line 2 of Snippet 1, the polymorphic logic may modify the input object's unique identifier each time original HTML file 110 is requested. Modified HTML file 120 is an example HTML file that the polymorphic logic may generate in response to intercepting original HTML file 110. Modified HTML file 120 may include modified HTML objects 122 and modified JavaScript 125. For purposes of illustrating a clear example, assume Snippet 4 is an excerpt from modified HTML objects 122.

| Snippet 4: | |
|---|---|
| line 1: | \<form id="login"\> |
| line 2: | \<p\>E-mail:\<input id="NewId01" name="NewId01"/\>\</p\> |
| line 3: | \<button type="submit"\>Login\</button\> |
| line 4: | \</form\> |

In Snippet 4, line 2, the identifier for the input object in Snippet 1 is changed from "email" to "NewId01". In order to not break the functionality of each instruction of the one or more instructions that reference the input object by the original object identifier, such as the instruction in Snippet 3, the polymorphic logic may update the one or more instructions to include the new identifier. For example, the polymorphic logic may update the JavaScript instruction in Snippet 3, as shown in Snippet 5.

| Snippet 5: | |
|---|---|
| line 1: | document.getElementById("NewId01").value = "Enter email"; |

Each time the input object's identifier changes, the instructions that reference the input object must be updated accordingly. This can cause many problems. For purposes of illustrating a clear example, assume a browser on a client computer requests original HTML file 110 from a server computer; the server computer, through the polymorphic logic, returns a modified version of original HTML file 110, in which the identifier for the input object is now "NewId02"; and a copy of original JavaScript file 115 that includes Snippet 5 is cached on the client computer. The browser may determine that it need not request a new copy of original JavaScript file 115 because there is already a copy stored locally on the client computer. However, the instruction(s) in the cached copy of original JavaScript file 115 may reference the input object by a previous identifier, such as "NewId01", not the new identifier "NewId02". Accordingly, functionality of the JavaScript instruction in Snippet 5 on the client computer may be broken as well as any instruction(s) that rely on the instruction in Snippet 5.

3.1 Inline Polymorphism

One way to solve the problem discussed above is to merge all the files that include and/or reference a modified object into a single file. For example, when the polymorphic logic generates modified HTML file 120, the polymorphic logic may include the modified JavaScript generated from original JavaScript file 115 into modified HTML file 120. Accordingly, in FIG. 1, modified HTML file 120 includes modified JavaScript 125, which may comprise the modified JavaScript based on original JavaScript file 115. For purposes of illustrating a clear example, assume modified JavaScript 125 include Snippet 5.

Modified HTML file 120 need not include JavaScript source reference 113 because the original JavaScript file 115 may have been modified and placed inline with the HTML in modified HTML file 120. Snippet 6 illustrates modified HTML objects 122 and modified JavaScript 125 in modified HTML file 120.

| Snippet 6 | |
|---|---|
| line 1: | \<form id="login"\> |
| line 2: | \<p\>E-mail:\<input id="NewId01" name="NewId01"/\>\</p\> |
| line 3: | \<button type="submit"\>Login\</button\> |

-continued

Snippet 6

| line 4: | </form> |
|---|---|
| line 5: | <script> |
| line 6: | document.getElementById("NewId01").value = "Enter email"; |
| line 7: | </script> |

A drawback to the solution illustrated above is that the resulting modified HTML file may be very large. For example, modified HTML file 120 may be the size of original HTML file 110 and original JavaScript file 115 combined. While Snippet 5 was short, original JavaScript file 115 may be very large. For example, each time original HTML file 110 is requested, the larger, modified HTML file 120 is returned, which may use a substantial amount of bandwidth if original HTML file 110 is frequently requested, and/or if original HTML file 110 and/or original JavaScript file 115 is large. Furthermore, in the example above, JavaScript source reference 113 only references original JavaScript file 115. However, JavaScript source reference 113 may reference one or more other files that include an instruction that references an object in original HTML file 110. Each of the one or more files may be large and may be merged with original HTML file 110 to generate modified HTML file 120.

Another drawback of the solution illustrated above is that the resulting modified HTML file may require a significant amount of computational power each time the original HTML file is requested. For example, each time original HTML file 110 is requested, the polymorphic logic may retrieve original HTML file 110, original JavaScript file 115, and any other file that original HTML file 110 references and that includes instructions that reference one or more objects in original HTML file 110, modify each file, and merge each file into modified HTML file 120. If original HTML file 110 is frequently requested, and/or if original HTML file 110 and/or original JavaScript file 115 are large files, then a substantial amount of computer power may be required.

3.2 Polymorphism with Polymorphic Hooks

In an embodiment, the polymorphic logic may add one or more polymorphic hooks in a file with one or more modified objects, to allow instructions in other files to gain access to the correct modified object identifier without also being modified. A polymorphic hook may be one or more instructions, which when executed correctly, return the correct modified identifier of an object. As discussed in detail herein, a polymorphic hook may perform one or more countermeasures to prevent attackers from using a polymorphic hook to receive a correct modified identifier of an object. For example, if a polymorphic hook is called with an incorrect parameter, outside of pre-defined call stack, and/or with or without one or more other criteria, then the polymorphic hook may fail to return the correct modified identifier of a modified object.

Figure 2:
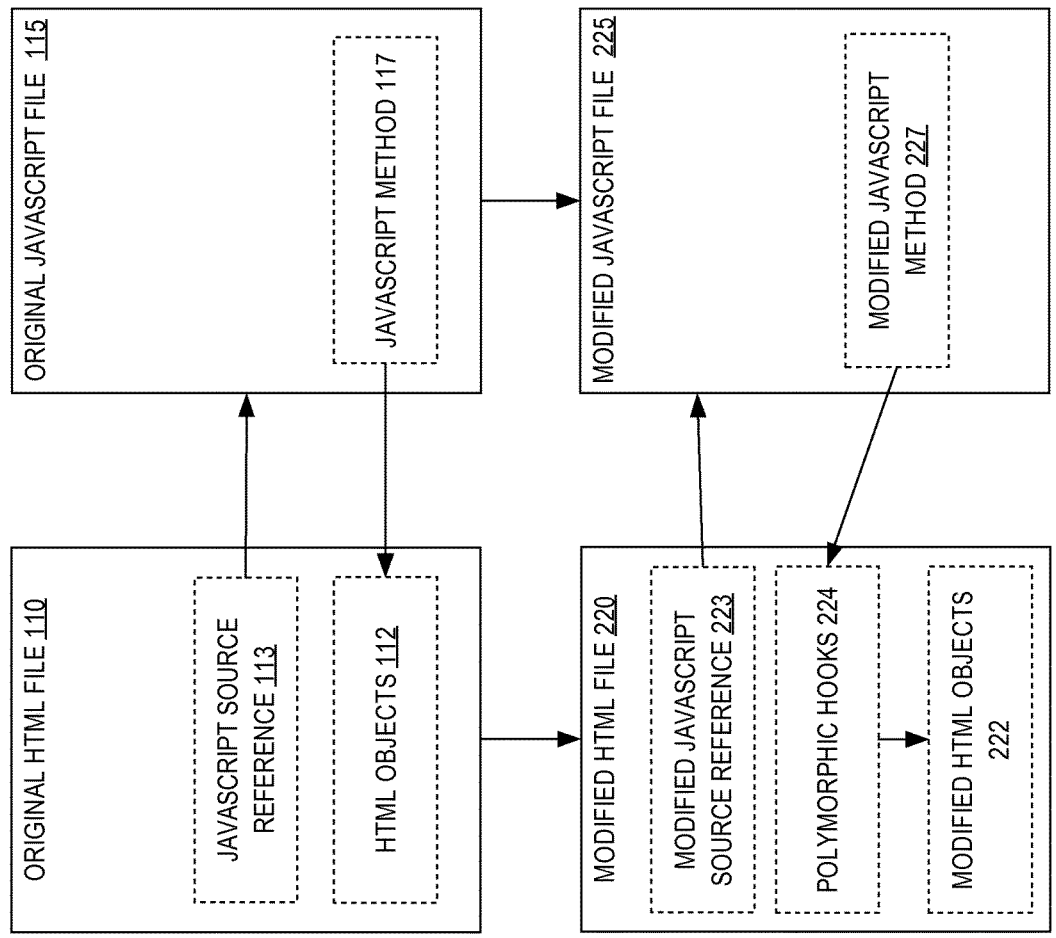
FIG. 2 illustrates a modified HTML file and a modified JavaScript file generated from an original HTML document and an original JavaScript document, using polymorphic hooks, according to one or more polymorphic protocols in an example embodiment.

FIG. 2 illustrates a modified HTML file and a modified JavaScript file generated from an original HTML document and an original JavaScript document, using polymorphic hooks, according to one or more polymorphic protocols in an example embodiment. Original HTML file 110 and original JavaScript file 115 in FIG. 2 may be the same files discuss above in FIG. 1. For purposes of illustrating a clear example, assume Snippet 1, Snippet 2, and Snippet 3 are excerpts of HTML objects 112, JavaScript source reference 113, and JavaScript method 117, respectively.

To prevent attackers from finding and/or using the input object defined in line 2 of Snippet 1, the polymorphic logic may modify the unique identifier for the input object each time original HTML file 110 is requested. Modified HTML file 220 is an example HTML file that the polymorphic logic may generate in response to intercepting original HTML file 110 from a server computer. In FIG. 2, modified HTML file 220 includes modified HTML objects 122, modified JavaScript source reference 123, and polymorphic hooks 224. For purposes of illustrating a clear example, assume Snippet 7 is an excerpt from modified HTML objects 222.

Snippet 7:

| line 1: | <form id="login"> |
|---|---|
| line 2: | <p>E-mail:<input id="NewId03" name="NewId03"/></p> |
| line 3: | <button type="submit">Login</button> |
| line 4: | </form> |

In Snippet 7, line 3, the identifier for the input object in Snippet 1 is changed from "email" to "NewId03". In order to not break the functionality of each instruction of the one or more instructions that reference the input object by the original object identifier, the polymorphic logic may insert one or more polymorphic hooks into the modified HTML file, and update the one or more instructions, which reference the input object, to use the one or more polymorphic hooks. For example, the polymorphic logic may insert polymorphic hooks 224 into modified HTML file 220 (an example of which is illustrated in Snippet 8), and update the JavaScript method 117 to produce modified JavaScript method 227 (an example of which is illustrated in Snippet 9).

Snippet 8:

| line 1: | <script> |
|---|---|
| line 2: | function polyHook01 (n) { return(n==32) ? "NewId03" : null; } |
| line 3: | </script> |

Snippet 9:

| line 1: | document.getElementById(polyHook01(32)).value = "Enter email"; |
|---|---|

In Snippet 8, line 2, the JavaScript function named polyHook01 may return the new modified identifier ("NewId03") for the object originally identified using the identifier "email". Each time the input object's identifier changes, the polymorphic hook may be updated to include the same identifier. For purposes of illustrating clear examples, the polymorphic hook names and modified object identifiers may comprise human readable features, such as "polyHook01" and "NewId03". However, polymorphic hook names and/or modified object identifiers may be, and/or may appear to be, random. For example, the polymorphic logic may produce "IN_87J2sef" as a polymorphic hook name, and "2jIOIUUNnnnO" as a modified identifier.

Modified JavaScript method 227 in Modified JavaScript file 225 need not be modified each time the input object's identifier changes, because modified JavaScript method 227 uses polymorphic hooks 224. For example, the modified JavaScript instruction in Snippet 9 references the polymorphic hook ("polyHook01") in Snippet 9. As long as poly- Hook01 is updated to include the input object's modified identifier, then the modified JavaScript instruction in Snippet 9 may retrieve the input object's modified identifier.

The polymorphic logic may save the updated JavaScript in a new JavaScript file. Accordingly, the polymorphic logic may add a reference to the new JavaScript file in the modified HTML file. For example, the polymorphic logic may modify JavaScript source reference 113 to produce modified JavaScript source reference 223 in modified HTML file 220. For purposes of illustrating a clear example, assume Snippet 10 is an excerpt of modified JavaScript source reference 223.

---
Snippet 10:
---
line 1:     <script src="login.poly01.js"></script>
---

In Snippet 10, the example code references a JavaScript file named "logic.poly01. js". For purposes of illustrating a clear example, assume "login.poly01.js" is the name for modified JavaScript file 225. Thus, when a browser receives modified HTML file 220, the browser can request the correct corresponding JavaScript file: modified JavaScript file 225.

Polymorphic hooks may allow separate files with instructions that reference a modified object to remain separate files even though object's identifier(s) may frequently change. For example, in response to a new request the polymorphic logic may generate a new modified HTML file. For purposes of illustrating a clear example, assume Snippet 11 is an excerpt of the new modified HTML file.

---
Snippet 11:
---
line 1:     <script>
line 2:     function polyHook01(n)) { return (n==32) ?
            "NewId04" : null; }
line 3:     </script>
line 4:     <form id="login">
line 5:     <p>E-mail:<input id="NewId04" name="NewId04"/></p>
line 6:     <button type="submit">Login</button>
line 7:     </form>
line 8:     <script src="login.poly01.js"></script>
---

In Snippet 11, even though the input object is assigned a new identifier (NewId04), instructions in modified JavaScript file 225 may still retrieve the correct input object's identifier through the updated polymorphic hook (polyHook01). Accordingly, if a browser running on a client computer has already cached login.poly01.js, then the browser need not request login.poly01.js again.

Additionally or alternatively, the browser may invalidate cached file(s), such as login.poly01.js, to force the browser to request a new version of the cached file. A new version of login.poly01.js may use different polymorphic hooks. Additionally or alternatively, a new version of login.poly01.js may use the same polymorphic hooks, but may be different than the previously cached version of login.poly01.js. For example, one or more blocks of code in the new version of login.poly01.js may be reordered. A browser may invalidate a cached file based on one or more settings in the browser, and/or in response to one or more caching instructions received from an intermediary computer and/or web server computer. The caching instructions and/or the browser settings may instruct the browser to invalidate a cached file after a particular amount of time, such as a day or a week, and/or at a particular date and/or time. The caching instructions may be included in HTML instructions, JavaScript instructions, and/or any other file(s) and/or set(s) of instructions.

Compared to inline polymorphism, the polymorphic logic may use less computational resources by implementing polymorphic hooks because the polymorphic logic need not change the instruction file(s) that reference the modified object each time the polymorphic logic changes the identifier of the modified object. For example, the polymorphic logic need not update modified JavaScript file 225 after generating the new modified HTML file, in which the identifier for the input object is changed from "NewId03" to "NewId04".

Also compared to inline polymorphism, the polymorphic logic may use less bandwidth because the file(s) that reference the modified object may be cached on a client computer. For purposes of illustrating a clear example, assume that a browser has cached modified JavaScript file 225 on a client computer. If the browser receives a newer modified HTML file, in which the identifier for the input object is changed from "NewId03" to "NewId04", then the browser need not request and/or receive an updated modified JavaScript file.

4.0 Example Network Topology That Implements One Or More Polymorphic Protocols

FIG. 3 illustrates a computer system comprising a browser, a web infrastructure, and an intermediary computer, which may be configured to perform one or more polymorphic protocols, in an example embodiment. In FIG. 3, system 300 comprises web infrastructure 305, client computer 399, intermediary computer 330, storage 340, and configuration 335 distributed across one or more interconnected networks.

While each of the components listed above is illustrated as if running on a separate, remote computer from each other, one or more of the components listed above may be part of and/or executed on the same computer. For example, intermediary computer 330, configuration 335, storage 340, and/or web infrastructure 305 may be executed on the same computer, local area, and/or wide area network. Additionally or alternatively, intermediary computer 330 may be a proxy server and/or layer for web infrastructure 305. Additionally or alternatively, intermediary computer 330 may be in line between a router and web infrastructure 305, such that intermediary computer 330 may intercept all network data sent to, and/or sent from, web infrastructure 305 over one or more protocols. Additionally or alternatively, intermediary computer 330, and/or one or more modules and/or logic comprising intermediary computer 330 discussed herein, may be a software layer between, and/or executed on, web infrastructure 305 and/or a component of web infrastructure 305. Additionally or alternatively, intermediary computer 330, and/or one or more modules and/or logic comprising intermediary computer 330 discussed herein, may be part of a server-side application that responds to requests over one or more standard and/or proprietary protocols, such as Hypertext Transfer Protocol ("HTTP") and/or any other protocol.

A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

4.1 Web Infrastructure

Web infrastructure 305 may comprise one or more server computers that receive requests for data from users through one or more client computers, such as client computer 399 and/or intermediary computer 330. Web infrastructure 305 may respond by sending data to the browser that sent the request. As illustrated in FIG. 3, the data sent from web infrastructure 305 may include one or more types of instructions, such as HTML, JavaScript, CSS, and/or any other standard or propriety instructions. The one or more computers in web infrastructure 305 may, but need not, be owned and/or managed by one or more independent entities and may span across one or more computer networks, such as the Internet.

A server computer may be a computer that receives requests for data and responds with data. For example, a web server computer may be an HTTP-based computer that receives HTTP requests and responds with data comprising HTML and/or JavaScript instructions. Additionally or alternatively, a server computer may respond with data that references data on other server computers in, and/or outside of, web infrastructure 305.

4.2 Intermediary Computer

Intermediary computer 330 may be an intermediary that may intercept instructions sent from web infrastructure 305, parse and/or execute one or more of the intercepted instructions, modify the intercepted instructions, generate and/or add new instructions, and send the modified and/or new instructions to a client computer. For example, intermediary computer 330 may intercept original HTML file 110 and original JavaScript file 115, generate modified HTML file 220 and modified JavaScript file 225, and send modified HTML file 220 and modified JavaScript file 225 to browser 395. Intermediary computer 330 may intercept a request from browser 395, generate a new and/or modified request, and send the new and/or modified request to web infrastructure 305.

Intermediary computer 330 may be an HTTP or SPDY intermediary that intercepts, parses, executes, and/or processes HTML, JavaScript, and CSS instructions. Additionally or alternatively, intermediary computer 330 may intercept requests for data and/or instructions from a client application, generate a new HTTP request, and send the newly generated HTTP request to one or more HTTP and/or SPDY-based web servers. Additionally or alternatively, intermediary computer 330 may be an intermediary for any other standard and/or proprietary protocol. Furthermore, each of the components discussed herein, which intermediary computer 330 is comprised of, may be configured to perform any of the processes and/or methods discussed herein for any standard and/or proprietary protocol.

Intermediary computer 330 may be a server computer that one or more domain name servers or other elements of the domain name system ("DNS") identify in DNS records as a destination network address associated with one or more internet domain names. Accordingly, intermediary computer 330 and/or intermediary computer 330 may receive requests sent to the one or more domains from a browser or bot. Based on using DNS to resolve the domain name in a request to a network address, intermediary computer 330 may forward the request, or a modified request, to a server computer in web infrastructure 305, such as original web server computer 402.

In FIG. 3, intermediary computer 330 is programmed to send instructions to, and receive requests from, a particular type of client application: browser 395. However, in an embodiment, intermediary computer 330 may be programmed to send instructions to, receive requests from, and/or open sockets with browsers and/or bots.

Figure 4:
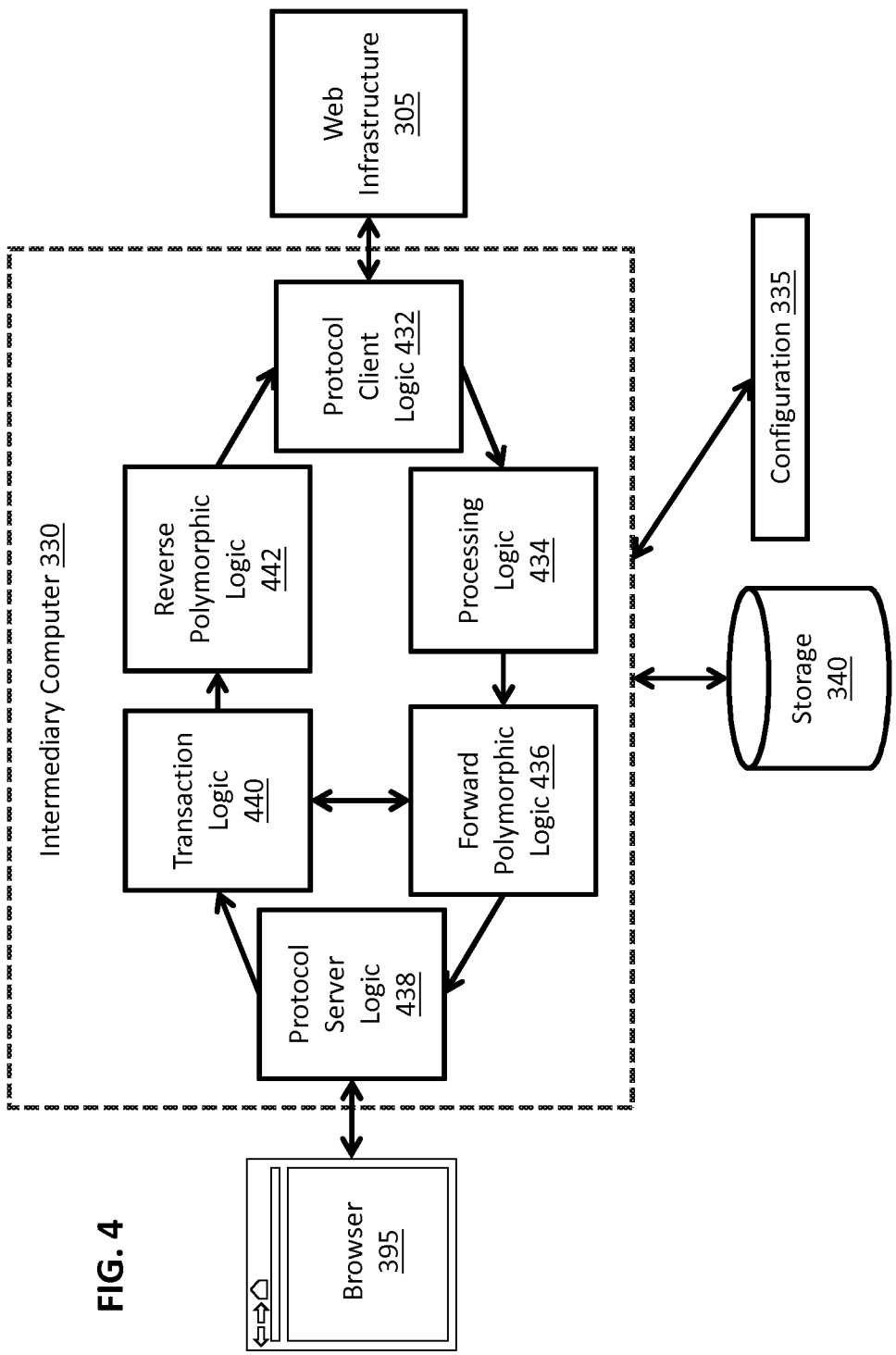
FIG. 4 illustrates detailed view of an intermediary computer in an example embodiment.

FIG. 4 illustrates detailed view of an intermediary computer in an example embodiment. In FIG. 4, intermediary computer 330 comprises protocol client logic 432, processing logic 434, forward polymorphic logic 436, protocol server logic 438, transaction logic 440, and reverse polymorphic logic 442. In an embodiment, each of the logical and/or functional units of intermediary computer 330 may be implemented using any of the techniques further described herein in connection with FIG. 7; for example, the intermediary computer 330 may comprise a general-purpose computer configured with one or more stored programs which when executed cause performing the functions described herein for the intermediary computer, or a special-purpose computer with digital logic that is configured to execute the functions, or digital logic that is used in other computing devices. While the figures include lines that indicate various devices and/or modules being communicatively coupled, each of the computers, devices, modules, storage, and configurations may be communicatively coupled with each other.

4.2.1 Protocol Client Logic

Protocol client logic 432 may intercept data over any standard or proprietary protocol. For example, protocol client logic 432 may intercept data over HTTP.

4.2.2 Processing Logic

Processing logic 434 may process instructions intercepted by protocol client logic 432, which causes processing logic 434 to generate one or more in-memory data structures that correspond to one or more objects. Processing one or more instructions may comprise parsing and/or executing the one or more instructions. After processing the instructions, processing logic 434 may notify forward polymorphic logic 436 to begin rendering instructions based on the one or more data structures.

Processing logic 434 may make requests for additional data. For example, if instructions received from protocol client logic 432 reference one or more instruction files, then processing logic 434 may request the one or more instruction files through protocol client logic 432.

4.2.3 Forward Polymorphic Logic

Forward polymorphic logic 436 may modify one or more original object identifiers to produce one or more new object identifiers. Forward polymorphic logic 436 may generate the one or more new object identifiers based on one or more polymorphic protocols. Forward polymorphic logic 436 may store mappings between one or more original object identifiers and one or more new object identifiers in storage 340.

Forward polymorphic logic 436 may render a new set of instructions based on the one or more data structures in memory and the new object identifiers. Additionally or alternatively, forward polymorphic logic 436 may generate one or more polymorphic hooks, which if executed correctly are configured to cause a browser and/or an execution environment, such as a JavaScript execution environment in a web browser, to return a valid new identifier that was generated by forward polymorphic logic 436 for one or more objects. Forward polymorphic logic 436 may operate on objects and/or render instructions based on one or more configurations and/or polymorphic protocols specified in configuration 335. Forward polymorphic logic 436 may send the rendered instructions to one or more client computers through protocol server logic 438.

4.2.4 Protocol Server Logic

Protocol server logic 438 may receive the instructions generated by forward polymorphic logic 436 and send the generated instructions to client computer 399. Additionally or alternatively, protocol server logic 438 may intercept requests from client computer 399 and forward the requests to transaction logic 440.

4.2.5 Transaction Logic

Transaction logic 440 may receive requests intercepted by protocol server logic 438 from browser 395. Transaction store 440 may retrieve one or more mappings between one or more original object identifiers and one or more new object identifiers stored in storage 340 based on data in the request, and forward the request with the retrieved one or more mappings to reverse polymorphic logic 442.

4.2.6 Reverse Polymorphic Logic

Reverse polymorphic logic 442 may translate requests intercepted by protocol server logic 438, which are based on instructions and/or new object identifiers generated by forward polymorphic logic 436, into requests that would have been generated by browser 395 had browser 395 received the original instructions with the original object identifiers sent from web infrastructure 305. Reverse polymorphic logic 442 may transform requests based on the one or more mappings retrieved by transaction logic 440. Reverse polymorphic logic 442 may send the transformed request to the intended web server computer(s) in web infrastructure 305 through protocol client logic 432.

4.2.7 Configurations

Configuration 342 may be a database, a configuration file, and/or any other system that stores configurations: settings, preferences, and/or protocols. Configuration 342 may store more than one configuration for one or more web servers in web infrastructure 305. For example, configuration 335 may include one or more polymorphic protocols that indicate particular object identifiers, in particular web pages, for one or more particular web sites, hosted on web infrastructure 305 that should be modified. Additionally or alternatively, configuration 335 may indicate that a particular web page need not be modified. Additionally or alternatively, configuration 335 may include data that indicates whether particular web pages should be processed by processing logic 434 and/or modified by forward polymorphic logic 436.

Configuration 335 may be modified by a user and/or administrator through one or more computers, such as intermediary computer 330, a computer in web infrastructure 305, and/or another computer not illustrated in system 300.

4.2.8 Storage

Storage 340 may be a database, a configuration file, and/or any other system and/or data structure that stores data. In FIG. 3, storage 340 is illustrated as if a separate computer from intermediary computer 330. Additionally or alternatively, storage 340 may be a data structure stored in memory on the one or more computers comprising intermediary computer 330. Additionally or alternatively, storage 340 may, at least in part, be a data structure stored in shared memory between one or more intermediary computers. Additionally or alternatively, intermediary computer 330 may, at least in part, be stored in volatile and/or non-volatile memory.

4.3 Browser

Browser 395 may be a browser as described herein and executed on a client computer, such as client computer 399. Additionally or alternatively, browser 395 may be a bot comprising one or more of the components traditionally found in a browser.

5.0 Process Overview

In an embodiment, a data processing method may be configured to intercept instructions from a server computer that are directed toward a browser, modify the intercepted instructions to include one or more new object identifiers, include one or more polymorphic hooks, render a second set of instructions comprising the modified set of instructions and one or more polymorphic hooks. In an embodiment, if the request is valid, then the processing method may be configured to modify the request, send the modified request to a server computer, receive data from the server computer in response to the modified request, and/or send a response to a client computer. Various embodiments may use standard web protocols, such as HTTP, and/or standard web-based instructions, such as HTML and/or JavaScript. Additionally or alternatively, other standard and/or proprietary protocols may be used. Additionally or alternatively, other standard and/or proprietary instructions may be used.

5.1 Intercepting Instructions From a Server Computer

Figure 5:
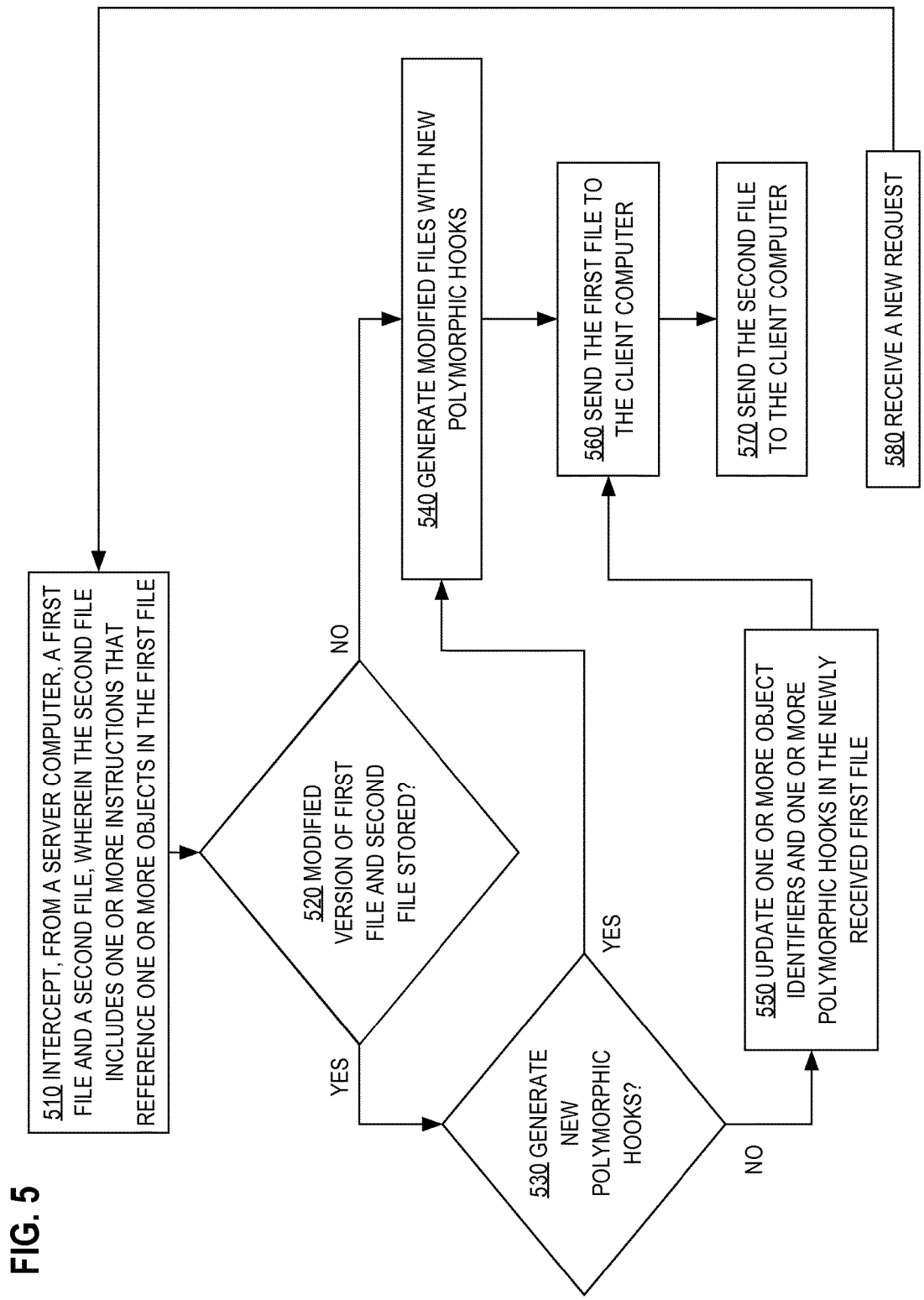
FIG. 5 illustrates a process for modifying one or more objects, adding one or more polymorphic hooks, and modifying one or more instructions that reference the one or more objects based on one or more polymorphic hooks, in an example embodiment.

FIG. 5 illustrates a process for modifying one or more objects, adding one or more polymorphic hooks, and modifying one or more instructions that reference the one or more objects based on one or more polymorphic hooks, in an example embodiment. In step 510, an intermediary computer intercepts, from a server computer, a first file and a second file, wherein the second file includes one or more instructions that reference one or more objects in the first file. For purposes of illustrating a clear example, assume browser 395 on client computer 399 requests original HTML file 110 from a server computer in web infrastructure 305. The request may be sent through intermediary computer 330. In response, protocol client logic 432 may receive original HTML file 110 from a web server computer in web infrastructure 305.

For purposes of illustrating a clear example, assume Snippet 2 is an excerpt of JavaScript source reference 113. Accordingly, processing logic 434 may process original HTML file 110 and determine that JavaScript source reference 113 references original JavaScript file 115. In response, processing logic 434 may request and receive original JavaScript file 115 from a server computer in web infrastructure 305, through protocol client logic 432. Processing logic 434 may process original JavaScript file 115.

In step 520, the intermediary computer may determine whether a modified version of the first file and the second file are stored. If so, then control may pass to step 530. Otherwise control may pass to step 540. In the current example, assume that modified HTML file 220 and modified JavaScript file 225 have not been generated yet. Accordingly, control may pass to step 540.

5.2 Generating Modified Files with One or More New Polymorphic Hooks

Figure 6:
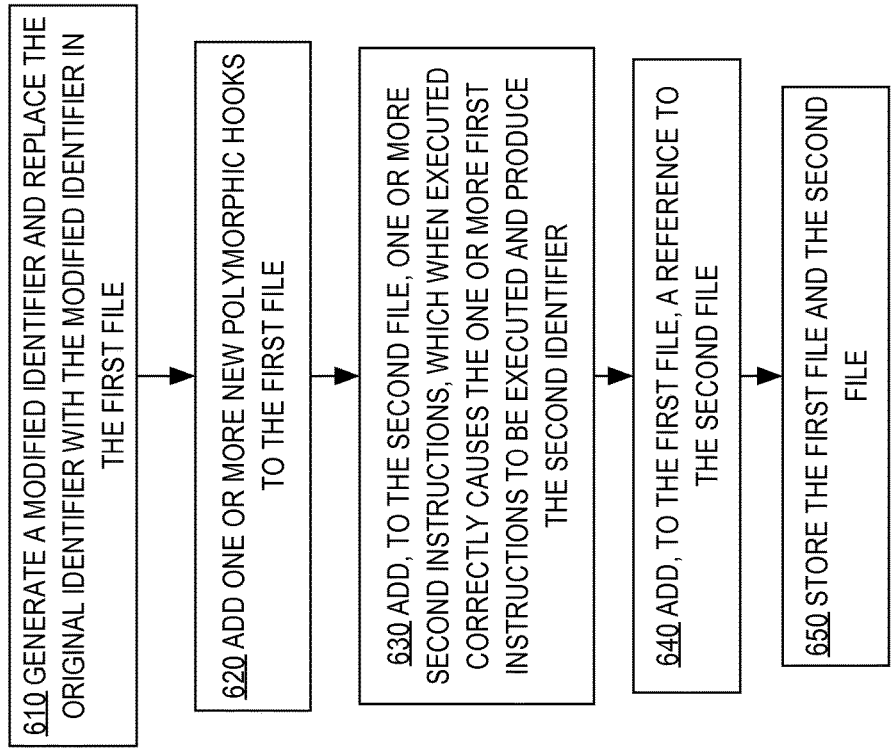
FIG. 6 illustrates a process for generating modified files with one or more new polymorphic hooks in an example embodiment.

In step 540, the intermediary computer generates modified files with one or more new polymorphic hooks. FIG. 6 illustrates a process for generating modified files with one or more new polymorphic hooks in an example embodiment. For purposes of illustrating a clear example, assume Snippet 1 is an excerpt from HTML objects 112, Snippet 3 is an excerpt of JavaScript method 117, and based on one or more polymorphic protocols in configuration 335, intermediary computer 330 is configured to modify the input object defined in line 2 of Snippet 1.

In step 610, the intermediary computer generates a modified identifier and replaces the original identifier with the modified identifier in the first file. For example, forward polymorphic logic 436 may generate modified HTML file 220, which includes modified HTML objects 222. For purposes of illustrating a clear example, assume the generated identifier is "NewId03", and Snippet 7 is an excerpt from modified HTML file 220.

Forward polymorphic logic 436 may generate and store one or more mappings between the original object identifiers and the new, generated object identifiers. For example, forward polymorphic logic 436 may store a mapping between the original identifier, "email", and the generated identifier, "NewId03". Forward polymorphic logic 436 may store the mapping in storage 340.

5.3 Adding Polymorphic Hooks

In step 620, the intermediary computer adds one or more polymorphic hooks to the first file. For example, forward polymorphic logic 436 may generate polymorphic hooks 224 and insert polymorphic hooks 224 into modified HTML file 220.

5.3.1 Polymorphic Hook Countermeasures

The forward polymorphic logic 436 may add one or more countermeasures to the polymorphic hooks. There are many countermeasures that forward polymorphic logic 436 may include in a polymorphic hook, such as tracking an internal state, performing a stack trace, and/or any other method to prevent a malicious script, bot, and/or other attack from using the polymorphic hook. For convenience of expression, a polymorphic hook may be called "correctly" if each countermeasure in the polymorphic hook is satisfied such that the polymorphic hook returns the correct modified identifier. While the example polymorphic hooks below illustrate two different types of countermeasures separately, the first countermeasure, the second countermeasure, and/or any other countermeasure may be implemented in the same polymorphic hook. Additionally or alternatively, a first polymorphic hook may use a different countermeasure than a second polymorphic hook in the same file.

5.3.1.1 Implementing a Multistate Polymorphic Hook

Snippet 8, line 2, illustrates a polymorphic hook that keeps an internal state, which if not satisfied will cause the polymorphic hook to not return the correct modified identifier. Specifically, the polymorphic hook named "polyHook01" takes a parameter "n". If the caller-method assigned a value to "n" that is not equal to thirty-two, then polyHook01 may return "null". However, if the caller-method assigned the value thirty-two to "n", then polyHook01 may return the new, modified identifier for the input object, which in that case is "NewId03".

Additionally or alternatively, if one or more criteria in a polymorphic hook are not satisfied, then the polymorphic hook may raise an error, return an incorrect identifier, close the browser, and/or perform one or more other operations that do not return the correct modified identifier.

Snippet 12, Snippet 13, and Snippet 14 illustrate a more complex polymorphic hook that keeps more than one internal state, and may be scattered throughout modified HTML file 220.

| Snippet 12: | |
| --- | --- |
| line 1: | <script> |
| line 2: | var polyHook02 = { }; |
| line 3: | </script> |

| Snippet 13: | |
| --- | --- |
| line 1: | <script> |
| line 2: | polyHook02.p = function(x) {this.x = x;} |
| line 3: | </script> |

| Snippet 14: | |
| --- | --- |
| line 1: | <script> |
| line 2: | polyHook02.q = function(y) { |
| line 3: | return (this.x == 13 && y ==32) ? "NewId03" : "BadId01"; |
| line 4: | } |
| line 5: | </script> |

Snippet 12 defines a polymorphic hook named "polyHook02". Snippet 13 defines a first method named "p" for polyHook02, which if executed sets the state of a member variable named "x" in polyHook02. Snippet 14 defines a second instance method named "q" in polyHook02, which if executed may return either "NewId03" or "BadId01". For purposes of illustrating a clear example, assume that "NewId03" is the correct modified identifier for a particular object, and "BadId01" is an incorrect identifier. If polyHook02 is not called correctly, then polyHook02 will not return the correct modified identifier. PolyHook02 is called correctly, if the member variable "x" in polyHook02 is set to thirteen before the method referenced by "q" is called with a parameter that equals thirty-two. If "x" is not set to thirteen when the method referenced by "q" is called, and/or if "q" is not called with a parameter that is set to thirty-two, then polyHook02 may determine that it was called incorrectly and may return the incorrect identifier, which in this example is "BadId01".

Bots need not include a runtime environment, such as a JavaScript runtime environment. Thus, a bot may not be capable of determining the correct modified object identifier by calling the polymorphic hook correctly. However, a malicious user or attacker may reverse engineer a polymorphic hook to determine how to correctly call the polymorphic hook.

To make reverse engineering a polymorphic hook harder, portions of a polymorphic hook may be scattered within the same file. For example, Snippet 12, Snippet 13, and/or Snippet 14 may be placed in different locations in modified HTML file 220. In an embodiment, Snippet 12 may be placed at a first location in modified HTML file 220, and Snippet 13 may be placed at a second location in modified HTML file 220 that is at least a particular distance away from the first location. Therefore, polymorphic hooks 224 need not be in a single, contiguous block as illustrated in modified HTML file 220.

5.3.1.2 Implementing a Polymorphic Hook that Validates a Call Tree Via a Stack Trace Additionally or alternatively, a polymorphic hook may perform a stack trace to determine whether the caller is an authorized caller. For purposes of illustrating a clear example, assume a particular object is modified and now includes a particular modified identifier, the particular object was referenced by a particular instruction in a particular file using the original identifier, and the particular instruction is part of a first method that is called by a second method. The particular instruction may be modified to call a polymorphic hook performs a stack trace and determines whether the polymorphic hook was called by the first method, and that the first method was called by the second method. If so, then the polymorphic hook may determine that the polymorphic hook was called correctly and may proceed to perform one or more other countermeasures and/or return the correct modified identifier. Otherwise, the polymorphic hook need not proceed to perform one or more other checks and/or return the correct modified identifier.

5.4 Modifying Instructions in other Files to Use the Polymorphic Hooks

In step 630, the intermediary computer inserts, into the second file, one or more second instructions, which when executed may cause the one or more first instructions to be executed correctly and produce the second identifier. For example, forward polymorphic logic 436 may generate modified JavaScript file 225, which includes modified JavaScript method 127, which may correctly call a polymorphic hook. For purposes of illustrating a clear example, assume Snippet 15 is an excerpt from modified JavaScript method 127.

| Snippet 15: |
| --- |
| line 1: polyHook02.p(32); |
| line 2: document.getElementById(polyHook02.q(13)).value = "Enter email"; |

In snippet 15, line 1, the JavaScript instruction calls an instance method for polyHook02 to set a first internal state. The JavaScript instruction in line 2 calls a second instance method for polyHook02 that sets a second state, and as discussed above, returns the correct object identifier, which in this example is "NewId03". In snippet 15, line 1 immediately precedes line 2. However, line 1 may be in a first location in modified JavaScript file 225 and line 2 may be in a second location in modified JavaScript file 225 that is at least a particular distance from the first location. Therefore, modified JavaScript method 227 need not be in a single contiguous block as illustrated as in modified JavaScript file 225.

5.5 Updating One or More References to One or More Files that Include One or More Instructions that Reference a Modified Object In step 640, the intermediary computer adds, to the first file, a new reference to the second file. For example, forward polymorphic logic 436 may modify JavaScript source reference 113 to produce modified JavaScript source reference 223 in modified HTML file 220. For purposes of illustrating a clear example, assume the file name assigned to modified JavaScript file 225 is "login.poly01.js". Accordingly, modified JavaScript source reference 223 may reference modified JavaScript file 225 as "login.poly01.js", rather than "login.js" in JavaScript source reference 113.

5.6 Storing the Modified Files to the Client Computer

In step 650, the intermediary computer stores the first file and the second file. For example, forward polymorphic logic 436 may store modified HTML file 220 in storage 340. Additionally or alternatively, forward polymorphic logic 436 may store the polymorphic hooks in polymorphic hooks 224 and/or modified JavaScript source reference 223 in storage 340. Forward polymorphic logic 436 may store modified JavaScript file 225 in storage 340. Forward polymorphic logic 436 may associate modified HTML file 220, polymorphic hooks 224, and/or modified JavaScript source reference 223 with modified JavaScript file 225 in storage 340.

5.7 Sending The Modified Files to the Client Computer

Returning now to FIG. 5, in step 560, the intermediary computer sends the first file to the client computer. For example, forward polymorphic logic 436 may send modified HTML file 220 to browser 395.

In the current example, browser 395 requested original file 110, not original JavaScript file 115 or modified JavaScript file 225; therefore, browser 395 may not be prepared and/or configured to receive modified JavaScript file 225 without an additional request. Furthermore, as discussed in detail, if browser 395 already has a copy of the modified JavaScript file, then browser 395 need not receive modified JavaScript file 225 from intermediary computer 330 again. Accordingly, forward polymorphic logic 436 need not send modified JavaScript file 225 to browser 395 until requested to do so by a browser and/or client computer.

In step 570, the intermediary computer sends the second file to the client computer. For example, browser 395 may process modified JavaScript source reference 223 in modified HTML file 220 and, in response, request "login.poly01.js" from intermediary computer 330.

Protocol server logic 438 may receive the request from browser 395. In response, protocol server logic 438 may retrieve modified JavaScript file 225, which in this example is saved in storage 340 as "login.poly01.js". Protocol server logic 438 may send modified JavaScript file 225 to browser 395.

Intermediary computer 330 need not be a single computer. As discussed herein, "a computer" may mean one or more computers. Accordingly, the particular computer that generates and/or stores modified JavaScript file 225 may be a different computer than the computer that receives the request for modified JavaScript file 225. Furthermore, one or more independent intermediary computers may be hosted on one or more interconnected computer networks. However, each computer in an intermediary computer cluster, cloud, or other computer system, and/or an independent intermediary computer, may be communicatively coupled to storage 340. Thus, any intermediary computer connected to storage 340 that receives the request for "login.poly01.js" may retrieve and send modified JavaScript file 225 to the browser and/or client computer.

5.8 Receiving A New Request

In step 580, the intermediary computer 330 receives a new request for an original HTML file. For example, protocol server logic 438 may receive a request from browser 395. Protocol server logic 438 may forward the request to transaction logic 440. Transaction logic 440 may determine whether the request includes one or more modified identifiers. If so, then transaction logic 440 may retrieve the corresponding mappings from storage 340 and send the request and the corresponding mappings to reverse polymorphic logic 442.

Reverse polymorphic logic 442 may generate a new request that is based on the received request and the one or more mappings from transaction logic 440. The new request may be the request that would have been received from browser 395 had browser 395 received the original instructions with the original object identifiers sent from web infrastructure 305. Reverse polymorphic logic 442 may send the new request through protocol client logic 432 to web infrastructure 305. In response, web infrastructure may return a new web page, and control may return to step 510.

If reverse polymorphic logic 442 may terminate requests that it determines to be fraudulent. For example, if reverse polymorphic logic 442 receives a request with an original identifier, and the original identifier should have been modified based on a polymorphic protocol in configuration 335, then reverse polymorphic logic 442 need not send/forward a request to web infrastructure 305 through protocol client logic 432. Reverse polymorphic logic 442 may terminate the request, and/or take one or more other negative actions.

5.9 Reusing Previously Generated Files

As discussed above, modified JavaScript file 225 may be reused even if the object modifiers in modified HTML file 220 are different. For purposes of illustrating a clear example, assume intermediary computer 330 intercepts original HTML file 110 again, modified HTML file 220, polymorphic hooks 224, and/or modified JavaScript source reference 223, are stored in storage 340, and modified JavaScript file 225 is stored in storage 340. Accordingly, in step 520, control may pass to step 530.

In step 530, the intermediary computer may determine whether to generate new polymorphic hooks. Generating new polymorphic hooks may cause the intermediary computer to regenerate both the first file (modified HTML file 220 in this example) and the second file (modified JavaScript file 225 in this example), since changing the names and/or functionality of the polymorphic hooks in the first file may break the functionality of the instructions in the second file. While regenerating both the first file and the second file may thwart some additional attacks, regenerating both the first file and the second file may be computationally more expensive and require more bandwidth as discussed herein.

An intermediary computer may determine whether to generate new polymorphic hooks based on one or more factors, such as time since one or more polymorphic hooks were generated and/or stored in storage 340, how long the second file has been store in storage 340, and/or any other factor useful in determining whether the polymorphic hooks may have been reverse engineered.

If forward polymorphic logic 436, based on one or more factors, determines that new polymorphic hooks should be regenerated then control may pass to step 540. Otherwise control may pass to step 550. For example, in step 530, forward polymorphic logic 436 may determine that modified JavaScript file 225 has been stored more than a threshold amount of time. Accordingly, control may proceed to step 540.

In step 540, forward polymorphic logic 436 may generate a new modified HTML file and a new modified JavaScript file as discussed herein. The new modified JavaScript file may have a different file name, such as "login.poly02.js". Thus, any client that receives the new modified HTML file may receive the new modified JavaScript file, referenced as "login.poly02.js". Whereas, any client that had received modified HTML file 220 before the new modified HTML file was created, may still retrieve modified JavaScript file 225, which is referenced as "login.poly01.js" and corresponds with modified HTML file 220. Additionally or alternatively, a version number associated with a file may be updated to indicate which version of a polymorphic file should be retrieved. For example, a first modified file named "login.poly.js" may be referenced in a URL as "http://domain.com/login.poly.js?version=1", and a second, newer modified file may be referenced in a URL as "http://domain.com/login.poly.js?version=2". If a browser receives the second URL and determines that the browser does not have the second version cached, the browser may request the second version of login.poly.js using the second URL even if the first version of login.poly.js is cached.

In step 550, the intermediary computer may update one or more object identifiers and include one or more updated polymorphic hooks in the newly received first file. For example, forward polymorphic logic 436 may generate a new modified HTML file from the newly received original HTML file 110 by updating one or more objects in the newly received original HTML file 110 with one or more new object identifiers.

In step 550, forward polymorphic logic 436 may insert the same polymorphic hooks used in modified HTML file 220 and stored in storage 340, but the polymorphic hooks may be updated to use the one or more new object identifiers. Forward polymorphic logic 436 may scatter the polymorphic hooks, and/or countermeasures in each polymorphic hook, differently the new modified HTML file than the previously generated modified HTML file 220.

In step 550, forward polymorphic logic 436 may update the JavaScript source reference the new modified HTML file to include "login.poly01.js", which is the name of modified JavaScript file 225 stored in storage 340. Thus, if a browser already has modified JavaScript file 225, then the browser need not request modified JavaScript file 225 from intermediary computer 330. Forward polymorphic logic 436 need not regenerate modified JavaScript file 225. Furthermore, forward polymorphic logic 436 need not re-save modified JavaScript file 225 in storage 340.

6.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
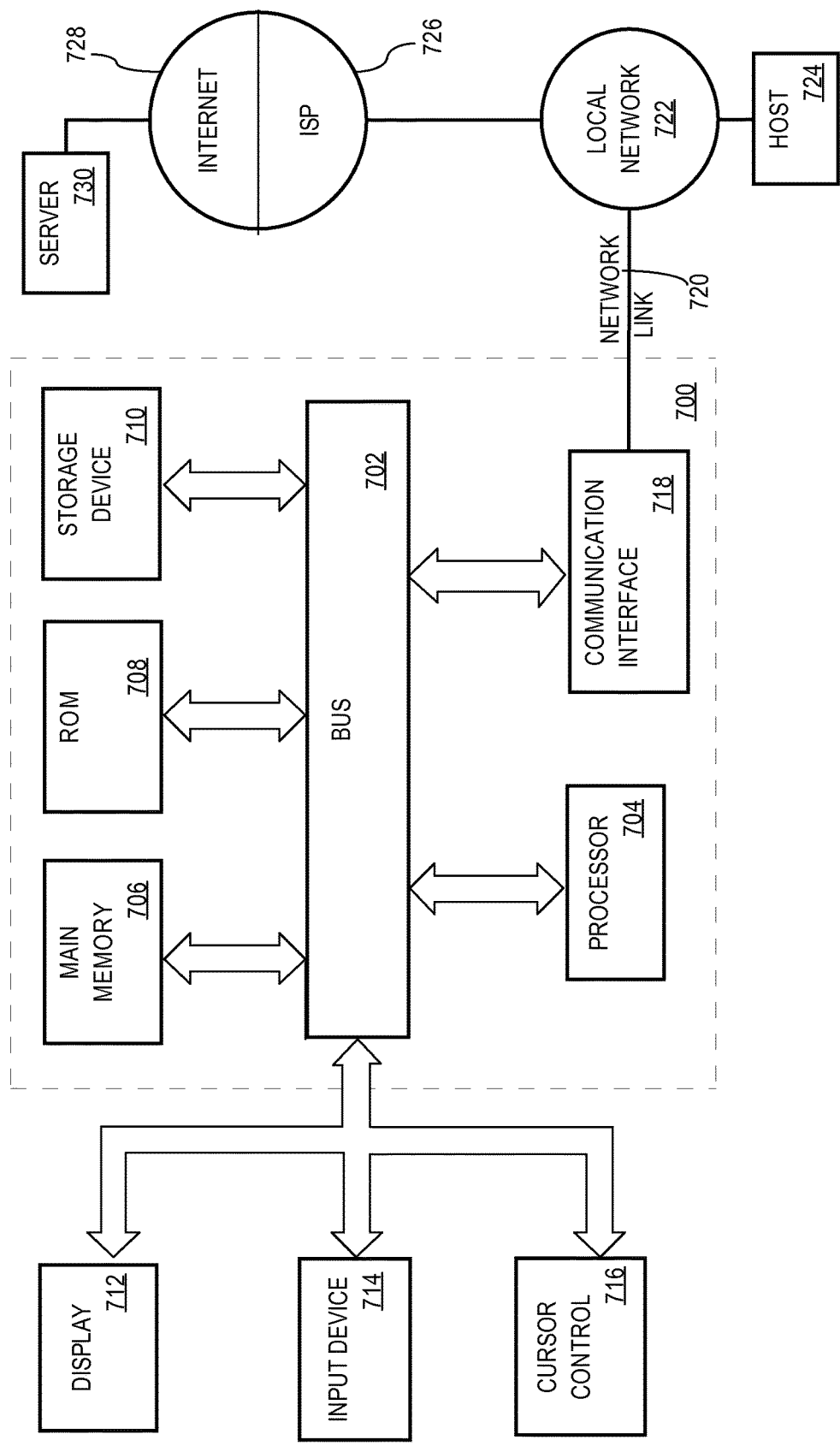
FIG. 7 illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7.0 Other Aspects of Disclosure

Using the networked computer arrangements, intermediary computer, and/or processing methods described herein, security in client-server data processing may be significantly increased. Polymorphic techniques discussed herein effectively reduce automated attacks. Consequently, one or more various attacks, such as a denial of service ("DOS") attack, credential stuffing, fake account creation, ratings or results manipulation, man-in-the-browser attacks, reserving rival goods or services, scanning for vulnerabilities, and/or exploitation of vulnerabilities, are frustrated because object identifiers and/or polymorphic hooks may change over time.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system configured to improve security of client computers interacting with server computers through an intermediary computer using one or more polymorphic protocols, and comprising:
   one or more processors;
   a processor logic coupled to the one or more processors and configured to:
   intercept, from a server computer, both a first file and a second file, wherein the first file defines a first object with a first identifier and the second file comprises a reference to the first object by the first identifier;
   generate a second identifier;
   replace the first identifier with the second identifier in the first file, and to add one or more first instructions to the first file, which when executed cause requiring a condition to produce the second identifier, and to thereby produce a modified first file;
   remove the reference to the first identifier from the second file;
   add, to the second file, one or more second instructions, which when executed cause the one or more first instructions to be executed and provide the condition to produce the second identifier, and to thereby produce a modified second file;
   send the first modified file and the second modified file to a first client computer.

2. The computer system of claim 1, wherein as part of removing the reference and adding the one or more second instructions, the processor logic is further configured to replace the reference with the one or more second instructions, which when executed return the second identifier.

3. The computer system of claim 1, wherein as part of removing the reference and adding the one or more second instructions, the processor logic is further configured to replace the reference with at least one instruction from the one or more second instructions, which when executed in concert with one or more other instructions in the one or more second instructions returns the second identifier.

4. The computer system of claim 1, wherein the processor logic is further configured to:
   intercept, from the server computer, a new copy of the first file, wherein the new copy of the first file defines the first object with the first identifier;
   generate a third identifier, wherein the third identifier is different than the first identifier;
   replace the first identifier with the third identifier in the new copy of the first file;
   add, to the new copy of the first file, one or more third instructions, wherein the one or more third instructions are different than the one or more first instructions;
   send the new copy of the first file with the one or more third instructions, but without the one or more first instructions to the first client computer, wherein the new copy of the first file is configured to not cause the first client computer to re-download the second file, wherein the one or more second instructions, when executed by the first client computer causes the one or more third instructions to be executed and produce the third identifier.

5. The computer system of claim 1, wherein the processor logic is further configured to:
   intercept, from the server computer, a new copy of the first file, wherein the new copy of the first file defines the first object with the first identifier;
   generate a third identifier;
   replace the first identifier with the third identifier in the new copy of the first file;
   add one or more third instructions, but not the one or more first instructions, to the new copy of the first file, wherein the one or more first instructions and the one or more third instructions are different;
   send the new copy of the first file and the second file to a second client computer, wherein the second file comprises the one or more second instructions, which when executed cause the one or more third instructions to be executed and produce the third identifier.

6. The computer system of claim 1, wherein as part of adding the one or more first instructions to the first file, the processor logic is configured to:
   determine a first location in the first file where the second identifier is located;
   determine a second location in the first file that at least a particular distance from the first location;
   wherein the one or more first instructions are added at the second location in the first file.

7. The server computer system of claim 1, wherein the processor logic is configured to add, in the first file, a new reference to the second file.

8. A server computer system configured to improve security of client computers interacting with server computers through an intermediary computer using one or more polymorphic protocols, and comprising:
   one or more processors;
   a polymorphic logic coupled to the one or more processors and configured to:
   intercept, from a server computer, a first file comprising a set of tags in HTML and a second file comprising one or more initial JavaScript instructions, wherein the set of tags define a first object with a first identifier and the one or more initial JavaScript instructions include a reference to the first object by the first identifier;
   generate a second identifier;
   replace the first identifier with the second identifier in the set of tags, and to add one or more first JavaScript instructions to the first file, which when executed cause requiring a condition to produce the second identifier, and to thereby produce a modified first file;
   remove the reference to the first identifier from the one or more initial JavaScript instructions;
   add, to the second file, one or more second JavaScript instructions, which when executed cause the one or more first JavaScript instructions to be executed and provide the condition to produce the second identifier, and to thereby produce a modified second file;
   send the first modified file and the second modified file to a first client computer.

9. The server computer system of claim 8, wherein as part of removing the reference and adding the one or more second JavaScript instructions, the polymorphic logic is further configured to replace the reference with the one or more second JavaScript instructions, which when executed return the second identifier.

10. The server computer system of claim 8, wherein as part of removing the reference and adding the one or more second JavaScript instructions, the polymorphic logic is further configured to replace the reference with at least one JavaScript instruction from the one or more second JavaScript instructions, which when executed in concert with one or more other JavaScript instructions in the one or more second JavaScript instructions returns the second identifier.

11. The server computer system of claim 8, wherein the polymorphic logic is further configured to:
intercept, from the server computer, a new copy of the first file, wherein the set of tags define the first object with the first identifier;
generate a third identifier, wherein the third identifier is different than the first identifier;
replace the first identifier with the third identifier in the set of tags;
add, to the new copy of the first file, one or more third JavaScript instructions, wherein the one or more third JavaScript instructions are different than the one or more first JavaScript instructions;
send the new copy of the first file with the one or more third JavaScript instructions, but without the one or more first JavaScript instructions to the first client computer, wherein the new copy of the first file is configured to not cause the first client computer to re-download the second file, wherein the one or more second JavaScript instructions, when executed by the first client computer causes the one or more third JavaScript instructions to be executed and produce the third identifier.

12. The server computer system of claim 8, wherein the polymorphic logic is further configured to:
intercept, from the server computer, a new copy of the first file, wherein the set of tags define the first object with the first identifier;
generate a third identifier;
replace the first identifier with the third identifier in the set of tags;
add one or more third JavaScript instructions, but not the one or more first JavaScript instructions, to the new copy of the first file, wherein the one or more first JavaScript instructions and the one or more third JavaScript instructions are different;
send the new copy of the first file and the second file to a second client computer, wherein the second file comprises the one or more second JavaScript instructions, which when executed cause the one or more third JavaScript instructions to be executed and produce the third identifier.

13. The server computer system of claim 8, wherein as part of adding the one or more first JavaScript instructions to the first file, the polymorphic logic is configured to:
determine a first location in the first file where the second identifier is located;
determine a second location in the first file that at least a particular distance from the first location;
wherein the one or more first JavaScript instructions are added at the second location in the first file.

14. The server computer system of claim 8, wherein the polymorphic logic is configured to add, in the first file, a new reference to the second file.

15. A data processing method for improving security and performance of client computers interacting with server computers comprising:
receiving, from a server computer, a first file, wherein the first file defines a first object with a first identifier and one or more first instructions, which when executed correctly return the first identifier;
receiving, from the server computer, a second file with one or more second instructions, which when executed cause the one or more first instructions to be executed correctly and produce the first identifier, wherein the first file is received separately from the second file;
producing a modified first file, wherein the modified first file defines the first object with a second identifier, and the first object is not identified by the first identifier, and one or more new first instructions, which when executed requires a condition to correctly return the second identifier;
determining that the modified first file references a modified second file, and in response, requesting the modified second file,
wherein the modified second file includes one or more new second instructions, which executed cause the one or more new first instructions to be executed correctly and provide the condition to return the second identifier, and wherein the one or more second instructions previously downloaded are not configured to cause the one or more new first instructions to be executed correctly;
wherein the data processing method is performed by one or more computing devices.

16. The data processing method of claim 15, wherein the second file does not include the first identifier, further comprising:
executing the one or more second instructions, and in response, receiving the first identifier; and
executing one or more additional instructions defined in the second file using the first identifier.

17. The data processing method of claim 16 further comprising:
caching the modified second file; and
executing the one or more new second instructions that are cached, which cause the one or more new first instructions to return the second identifier, and in response, receiving the second identifier.

18. The data processing method of claim 15, wherein the one or more first instructions are not contiguously stored in the first file, and are dispersed throughout the first file.

19. The data processing method of claim 15, wherein the one or more second instructions are not contiguously stored in the second file, and are dispersed throughout the second file.

20. A data processing method for improving security and performance of client computers interacting with server computers comprising:
receiving, from a server computer, a first file comprising a set of tags in HTML, which define a first object with a first identifier, and comprising one or more first JavaScript instructions, which when executed correctly return the first identifier;
receiving, from the server computer, a second file with one or more second JavaScript instructions, which when executed cause the one or more first JavaScript instructions to be executed correctly and produce the first identifier, wherein the first file is received separately from the second file;
producing a modified first file comprising a set of new tags in HTML, wherein the modified first file defines the first object with a second identifier, and the first object is not identified by the first identifier, and one or more new first JavaScript instructions, which when executed requires a condition to correctly return the second identifier;
determining that the modified first file references a modified second file, and in response, requesting the modified second file,
wherein the modified second file includes one or more new second JavaScript instructions, which executed cause the one or more new first JavaScript instructions to be executed correctly and provide the condition to return the second identifier, and wherein the one or more second instructions previously downloaded are not configured to cause the one or more new first JavaScript instructions to be executed correctly;

wherein the data processing method is performed by one or more computing devices.

21. The data processing method of claim 20, wherein the second file does not include the first identifier, further comprising:

executing the one or more second JavaScript instructions, and in response, receiving the first identifier; and executing one or more additional JavaScript instructions defined in the second file using the first identifier.

22. The data processing method of claim 21 further comprising:

caching the modified second file; and executing the one or more new second JavaScript instructions that are cached, which cause the one or more new first JavaScript instructions to return the second identifier, and in response, receiving the second identifier.

23. The data processing method of claim 20, wherein the one or more first JavaScript instructions are not contiguously stored in the first file, and are dispersed throughout the first file.

24. The data processing method of claim 21, wherein the one or more second JavaScript instructions are not contiguously stored in the second file, and are dispersed throughout the second file.

* * * * *